United States Patent
Sun et al.

(10) Patent No.: US 8,607,331 B2
(45) Date of Patent: Dec. 10, 2013

(54) CAPTCHA IMAGE AUTHENTICATION METHOD AND SYSTEM

(75) Inventors: Hung-Min Sun, Hsinchu (TW); Chun-Hao Yeh, New Taipei (TW); Yao-Hsin Chen, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/230,924

(22) Filed: Sep. 13, 2011

(65) Prior Publication Data
US 2013/0019278 A1    Jan. 17, 2013

(30) Foreign Application Priority Data
Jul. 15, 2011   (TW) .................................. 100125063

(51) Int. Cl.
*H04L 9/32*       (2006.01)
*G06F 7/04*       (2006.01)
*H04L 29/06*      (2006.01)

(52) U.S. Cl.
USPC ..................................... 726/19; 726/6; 726/7

(58) Field of Classification Search
None
See application file for complete search history.

(56) References Cited

U.S. PATENT DOCUMENTS

| | | | | |
|---|---|---|---|---|
| 5,559,961 | A * | 9/1996 | Blonder | 726/18 |
| 6,209,104 | B1 * | 3/2001 | Jalili | 726/18 |
| 7,219,368 | B2 * | 5/2007 | Juels et al. | 726/2 |
| 7,243,239 | B2 * | 7/2007 | Kirovski et al. | 713/184 |
| 7,376,899 | B2 * | 5/2008 | Mantyla | 715/741 |
| 7,536,556 | B2 * | 5/2009 | Fedorova et al. | 713/183 |
| 7,577,987 | B2 * | 8/2009 | Mizrah | 726/5 |
| 7,743,256 | B2 * | 6/2010 | Yang | 713/182 |
| 7,917,508 | B1 | 3/2011 | Baluja et al. | |
| 8,117,458 | B2 * | 2/2012 | Osborn et al. | 713/183 |
| 8,307,424 | B2 * | 11/2012 | Hirakawa | 726/19 |
| 8,483,518 | B2 * | 7/2013 | Zhu et al. | 382/305 |
| 2005/0246138 | A1 * | 11/2005 | Park | 702/189 |
| 2008/0133347 | A1 | 6/2008 | Josifovski et al. | |
| 2009/0012842 | A1 | 1/2009 | Srinivasan et al. | |
| 2009/0113294 | A1 * | 4/2009 | Sanghavi et al. | 715/269 |
| 2009/0178136 | A1 * | 7/2009 | Ruddy | 726/19 |
| 2009/0249447 | A1 * | 10/2009 | Ogawa | 726/4 |
| 2010/0083353 | A1 * | 4/2010 | Wang | 726/5 |
| 2011/0154482 | A1 * | 6/2011 | Heiner et al. | 726/19 |
| 2011/0298709 | A1 * | 12/2011 | Vaganov | 345/158 |
| 2012/0011564 | A1 * | 1/2012 | Osborn et al. | 726/2 |

(Continued)

OTHER PUBLICATIONS

Jeremy Elson, John R. Douceur, Jon Howell and Jared Saul, "Asirra: A CAPTCHA that Exploits Interest-Aligned Manual Image Categorization", 2007, ACM.

*Primary Examiner* — Christopher Revak
(74) *Attorney, Agent, or Firm* — WPAT, PC; Justin King

(57) ABSTRACT

The present disclosure relates to a Completely Automated Public Turing Test to tell Computers and Humans Apart (CAPTCHA) image authentication method and system. The CAPTCHA image authentication method comprises the steps of: collecting a plurality of first objects; defining a plurality of variables so as to be used as basis for classifying and dividing the plural first objects into M groups accordingly while allowing each group in the M groups to correspond to at least one variable selected from the plural variables; selecting at least one group from the M groups while further grading and dividing the first objects in the selected group into subgroups of N grades based upon a standard unit of the variable corresponding to the selected group; sorting and storing the subgroups of N grades; and selecting a plurality of authentication objects from the subgroups of N grades to be used in an authentication process.

23 Claims, 5 Drawing Sheets

Sorting the object shown in the image:

The sorting is correct:

(56) References Cited

U.S. PATENT DOCUMENTS

| | | | |
|---|---|---|---|
| 2012/0023574 A1* | 1/2012 | Osborn et al. | 726/19 |
| 2012/0246737 A1* | 9/2012 | Paxton et al. | 726/27 |
| 2012/0323700 A1* | 12/2012 | Aleksandrovich et al. | 705/14.69 |
| 2013/0167225 A1* | 6/2013 | Sanft et al. | 726/19 |

* cited by examiner

Seleating objects shown in the on the right whichever is related to the object shown in the image on the left:

The selection is correct:

CAPTCHA IMAGE AUTHENTICATION METHOD AND SYSTEM

TECHNICAL FIELD

The present disclosure relates to a Completely Automated Public Turing Test to tell Computers and Humans Apart (CAPTCHA) image authentication method and system, and more particularly, to a CAPTCHA image authentication method and system utilizing the relationship between graphs and variables.

TECHNICAL BACKGROUND

With rapid advance of network communication technology, there are more and more network services that are becoming essential for our everyday lives, such as e-mail service, bulletin board system (BBS), on-line train ticket reservation/purchase service, and so on. For preventing those network services from being abused or attacked by hackers, a program of Completely Automated Public Turing Test to tell Computers and Humans Apart, i.e. CAPTCHA, is provided to be used for telling whether its user is a human or a computer. CAPTCHA nowadays are commonly used in many websites to determine whether the user is human, and thus to prevent abuse from bots, or automated programs usually written to generate spam.

A common type of CAPTCHA, being a type of challenge-response test used in computing as an attempt to ensure that the response is generated by a person, requires the user to type letters or digits from a distorted image that appears on the screen. Like any security system, CAPTCHA implementations, especially those which have not been designed and reviewed by experts in the fields of security, are prone to common attacks using optical character recognition (OCR) means or other automatic recognition means. With the improvement of the automatic recognition means for beating visual CAPTCHAs, the success rate of recognition is becoming higher and higher, and responsively recent CAPTCHA systems have to generate a string of text/digit with even higher distortion just for blocking those automatic recognition means for beating visual CAPTCHAs. However, the string of text/digit that is highly distorted may sometimes even be difficult for a human user to recognize. Consequently, the user may have to refresh the web service using the CAPTCHA system again and again until finally a recognizable string of text/digit had popper up, and then the user is able to enter the correct solution to the CAPTCHA system for using the web service. Therefore, such CAPCHA systems may be the cause of inconvenience and complaint as it may cause any user to spend a conceivable amount of time just to pass the CAPTCHA test for entering the web service.

TECHNICAL SUMMARY

In an embodiment, the present disclosure provides a Completely Automated Public Turing Test to tell Computers and Humans Apart (CAPTCHA) image authentication method, which comprises the steps of: collecting a plurality of first objects; defining a plurality of variables so as to be used as basis for classifying and dividing the plural first objects into M groups accordingly while allowing each group in the M groups to correspond to at least one variable selected from the plural variables; selecting at least one group from the M groups while further grading dividing the first objects in the selected group into subgroups of N grades based upon a standard unit of the variable corresponding to the selected group; sorting and storing the subgroups of N grades; selecting a plurality of authentication objects from the subgroups of N grades to be used in an authentication process.

In another embodiment, the present disclosure the present disclosure provides a Completely Automated Public Turing Test to tell Computers and Humans Apart (CAPTCHA) image authentication system, which comprises: an acquisition unit, for collecting a plurality of first objects; a processing unit, coupling to the acquisition unit to be used for defining a plurality of variable while allowing the plural variables to be used as basis for performing the following procedures: classifying and dividing the plural first objects into M groups accordingly while allowing each group in the M groups to correspond to at least one variable selected from the plural variables; selecting at least one group from the M groups while further grading dividing the first objects in the selected group into subgroups of N grades based upon a standard unit of the variable corresponding to the selected group; sorting and storing the subgroups of N grades; selecting a plurality of authentication objects from the subgroups of N grades to be used in an authentication process; and a storage unit, coupling to the processing unit to be used for storing the sorted subgroups of N grades.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
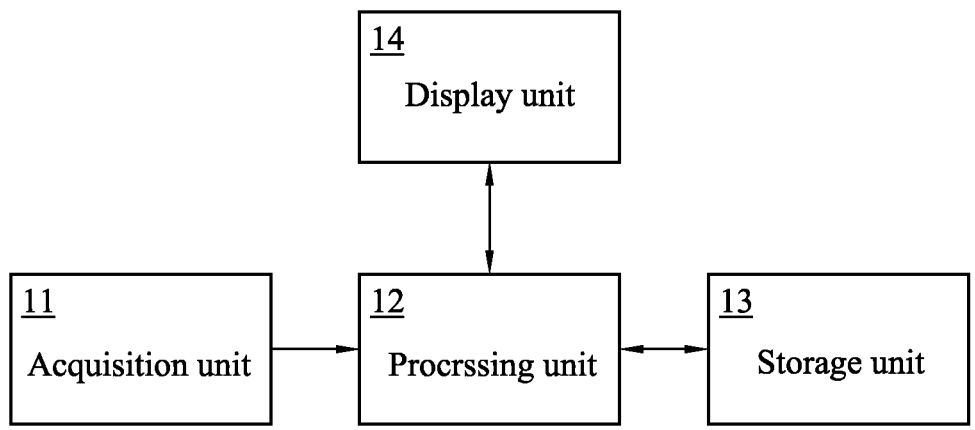
FIG. 1 is a schematic diagram showing a CAPTCHA image authentication system according to an embodiment of the present disclosure.

Please refer to FIG. 1, which is a schematic diagram showing a CAPTCHA image authentication system according to an embodiment of the present disclosure. As shown in FIG. 1, the authentication system 1 comprises: an acquisition unit 11, a processing unit 12 and a storage unit 13.

The acquisition unit 11 is used for collecting a plurality of first object, which can be a static picture, a dynamic image or the combination of the two. The processing unit 12 is coupled to the acquisition unit 11 so as to be used for defining a plurality of variable while allowing the plural variables to be used as basis for performing the following procedures: classifying and dividing the plural first objects into M groups accordingly while allowing each group in the M groups to correspond to at least one variable selected from the plural variables; selecting at least one group from the M groups while further grading dividing the first objects in the selected group into subgroups of N grades based upon a standard unit of the variable corresponding to the selected group; sorting and storing the subgroups of N grades; selecting a plurality of authentication objects from the subgroups of N grades to be used in an authentication process. It is noted that the values of M and N are integral values; and each of the plural variable is a measureable variable, such as size, speed, weight, height, volume, age, length, and area, etc. In addition, the aforesaid variables can be classified using semantic relatedness measurement, but is not limited thereby. Moreover, the processing unit 12 is further capable of performing the following procedures: defining a selection criteria before or after completion of the selection of the plural authentication objects; displaying the selection criteria and the plural authentication objects on a display unit 14 for allowing a user to acquire and sort the plural authentication according to the selection criteria; and making an evaluation to determine whether the plural authentication objects are successfully acquired and are sorted corrected; and if so, the authentication process is determined to be passed; otherwise, the authentication process is failed while enabling a new set of authentication objects to be selected. Thereafter, after sorting the selected group into subgroups of N grades, the processing unit 12 is enabled to perform the following procedure: defining a margin interval to be used for defining a region evenly to the left and to the right from the border of any two neighboring subgroups of N grades after being sorted, and accordingly removing each and every objects, referring as second objects, in those related neighboring subgroups that are located within their corresponding margin intervals; and selecting the plural authentication objects from the subgroups of N grades after having their corresponding second objects removed. It is noted that the margin interval is defined based upon a mathematics equation, whereas the mathematics equation can be designed according to any actual requirement. For instance, referring to the sorted N-grade subgroups, the margin interval for the $n^{th}$-grade subgroup and its prior $(n-1)^{th}$-grade subgroup is defined to be a value equal to the multiplication of 0.5 with the difference between the maximum range of the $n^{th}$-grade subgroup and the maximum range of the $(n-1)^{th}$-grade subgroup, however, it is not limited thereby. In another embodiment, the margin interval is defined to be a present difference or a preset multiple between any two neighboring subgroups of N grades, in which the preset multiple can be increasing or decreasing from a predesignated starting set including two neighboring subgroups to the left and/or to the right to those other sets of two neighboring subgroups. In addition, in another embodiment, the processing unit 12 is configured to perform the following procedures: after sorting the selected group into subgroups of N grades, randomly selecting P grades from the N grades so as to select the plural authentication objects from the subgroups relating to the selected P grades, whereas the value P can be an integral value. Moreover, in further another embodiment, the processing unit 12 can be configured to perform the following procedures: after sorting the selected group into subgroups of N grades, defining a margin interval to be used for defining a region evenly to the left and to the right from the border of any two neighboring subgroups of N grades, and accordingly removing each and every objects, referring as second objects, in those related neighboring subgroups that are located within their corresponding margin intervals; and randomly selecting P grades from the N grades so as to select the plural authentication objects from the subgroups relating to the selected P grades after having their corresponding second objects removed. It is noted that the value P can also be an integral value; and the margin interval can also be defined to be a present difference or a preset multiple between any two neighboring subgroups of N grades, whereas the preset multiple can be increasing or decreasing from a predesignated starting set including two neighboring subgroups to the left and/or to the right to those other sets of two neighboring subgroups. The storage unit 13, being coupled to the processing unit 12, is used for storing the sorted subgroups of N grades.

Figure 2:
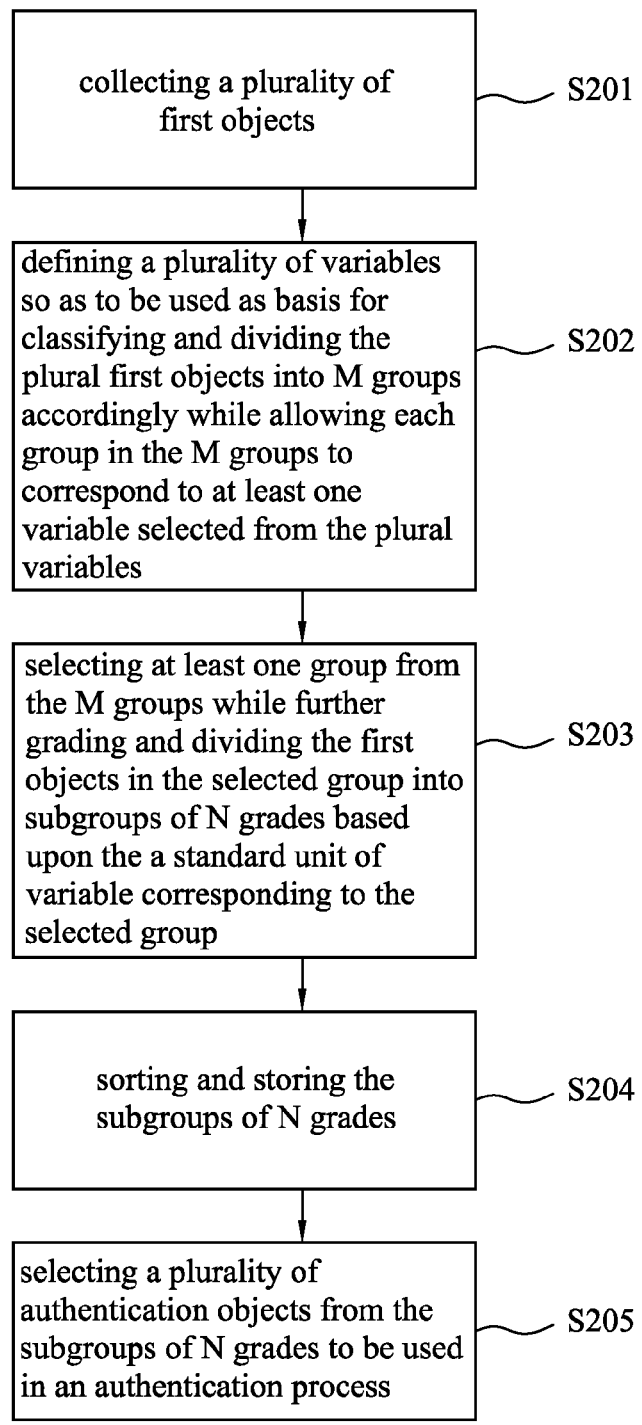
FIG. 2 is a flow chart depicting the steps performed in is a CAPTCHA image authentication method according to an embodiment of the present disclosure.
Figure 3A:
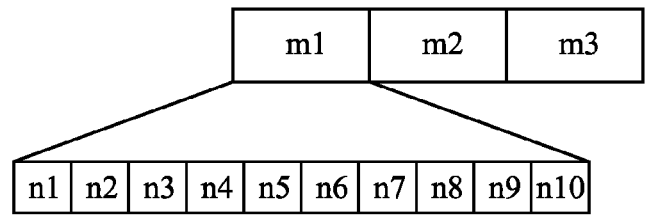
FIG. 3A is a schematic diagram showing how the first objects are being classified and divided into groups and then the first objects of each group are further being classified and divided into subgroups according to an embodiment of the present disclosure.

Please refer to FIG. 2, which is a flow chart depicting the steps performed in is a CAPTCHA image authentication method according to an embodiment of the present disclosure. The CAPTCHA image authentication method 2 shown in this embodiment can be applied using the CAPTCHA image authentication system of FIG. 1. The method starts at step s201. At step 201, after establishing a storage unit 13 or a database, an acquisition unit 11 is provided for collecting a plurality of first objects, and then the flow proceeds to step s202. It is noted that each of the first object can be a static picture, a dynamic image, or the combination of the two. At step s202, a plurality of variables is defined so as to be used as basis for classifying and dividing the plural first objects into M groups accordingly while allowing each group in the M groups to correspond to at least one variable selected from the plural variables; and then the flow proceeds to step s203. It is noted that the values of M and N are integral values; and each of the plural variable is a measureable variable, such as size, speed, weight, height, volume, age, length, and area, etc. In addition, the aforesaid variables can be classified using semantic relatedness measurement, but is not limited thereby. As the embodiment shown in FIG. 3A, there are three measureable variables, i.e. height, weight and size, to be selected and used for classifying the plural first objects into three groups, i.e. m1, m2 and m3, while allowing each group to correspond to at least one variable selected from the three variables. For instance, the m1 group is corresponding to height, the m2 group is corresponding to weight, and the m3 group is corresponding to size, and thereby, the plural first objects are classified and assigned respectively to the three groups, i.e. m1, m2 and m3, according to their height, weight and size.

At step s203, at least one group is selected from the M groups for allowing the first object in the selected group to be graded and divided into subgroups of N grades based upon the a standard unit of variable corresponding to the selected group; and then the flow proceeds to step 204. At step s204, the subgroups of N grades are sorted and then stored; and then the flow proceeds to step s205. In the embodiment shown in FIG. 3A, the m1 group is selected, whereas the first objects in the m1 group is graded and divided into subgroups of 10 grades with reference to a standard unit of height, that is, the first objects in the m1 group is divided into the n1 subgroup, the n2 subgroup, the n3 subgroup, . . . , and the n10 subgroup, in a manner either from large to small or from small to larger in different height ranges. In this embodiment, the first objects in the m1 group that are shorter than 200 cm are classified and collected into the n1 subgroup, the first objects in the m1 group whose heights are between 201 cam and 400 cm are classified and collected into the n2 subgroup, the first objects in the m1 group whose heights are between 401 cam and 600 cm are classified and collected into the n3 subgroup, the first objects in the m1 group whose heights are between 601 cam and 800 cm are classified and collected into the n4 subgroup, the first objects in the m1 group whose heights are between 801 cam and 1000 cm are classified and collected into the n5 subgroup, the first objects in the m1 group whose heights are between 1001 cam and 1200 cm are classified and collected into the n6 subgroup, the first objects in the m1 group whose heights are between 1201 cam and 1400 cm are classified and collected into the n7 subgroup, the first objects in the m1 group whose heights are between 1401 cam and 1600 cm are classified and collected into the n8 subgroup, the first objects in the m1 group whose heights are between 1601 cam and 1800 cm are classified and collected into the n9 subgroup, and the first objects in the m1 group whose heights are between 1801 cam and 2000 cm are classified and collected into the n10 subgroup; or vice versa. In addition to the aforesaid grading and classification manner, the grading standard unit can be a value of addictive increasing, multiplicative increasing or multiplicative decreasing, but is not limited thereby. For instance, in another embodiment where the first objects in the m1 group are graded and divided according to a standard unit of addictive increasing, the first objects in the m1 group that are shorter than 180 cm are classified and collected into the n1 subgroup as the standard unit is defined to be 180 cm; the first objects in the m1 group whose heights are between 181 cam and 720 cm are classified and collected into the n2 subgroup, that is, the objects whose heights are higher than the standard unit and within four times the standard unit are classified and collected into the n2 subgroup, and then the standard unit is redefined to be 720 cm; the first objects in the m1 group whose heights are between 721 cam and 2880 cm are classified and collected into the n3 subgroup, that is, the objects whose heights are higher than the redefined standard unit and within four times the redefined standard unit are classified and collected into the n3 subgroup, and then the standard unit is redefined to be 2880 cm; and so forth.

Figure 3B:
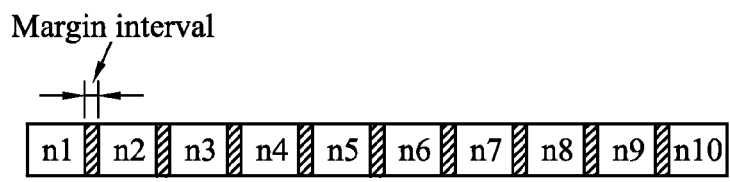
FIG. 3B, FIG. 3C and FIG. 3D are schematic diagrams showing different ways for selecting authentication objects to be used in an authentication process according to the present disclosure.

Furthermore, in the present embodiment, after the subgroups of N grades are sorted, a margin interval are provided to be used for defining a region evenly to the left and to the right from the border of any two neighboring subgroups of N grades, and accordingly removing each and every objects, referring as second objects, in those related neighboring subgroups that are located within their corresponding margin intervals, so as to select a plurality of authentication objects from the subgroups of N grades without the corresponding second objects. As shown in FIG. 3B, the margin interval is defined to be 100 cm, by that the first objects located within a region evenly to the left and to the right from the border of any two neighboring subgroups of N grades are referred as second object and thus being removed from their corresponding subgroups. That is, for the n1 subgroup and the n2 subgroup that are neighboring to each other, those first objects in the n1 subgroup that are higher than 150 cm will be referred as the second objects and thus removed from the n1 subgroup, and those first objects in the n2 subgroup that are shorter than 250 cm will be referred as the second objects and thus removed from the n2 subgroup. Similarly, for the n2 subgroup and the n3 subgroup that are neighboring to each other, those first objects in the n2 subgroup that are higher than 350 cm will be referred as the second objects and thus removed from the n1 subgroup, and those first objects in the n3 subgroup that are shorter than 450 cm will be referred as the second objects and thus removed from the n3 subgroup; and so forth. Consequently, the n1 subgroup will only contains those first objects that are shorter than 150 cm; the n2 subgroup will only contains those first objects whose height is ranged between 250 cm and 350 cm; the n3 subgroup will only contains those first objects whose height is ranged between 450 cm and 550 cm; . . . ; and the n10 subgroup will only contains those first objects whose height is ranged between 1850 cm and 2000 cm. Similarly, the margin interval can be determined according to actual requirement and thus can be a value of addictive increasing, multiplicative increasing or multiplicative decreasing, but is not limited thereby. For instance, in another embodiment, the margin interval is defined as a value of multiplicative decreasing, and thus, when the margin interval for the n1 subgroup and the n2 subgroup is $X_1$, the margin interval for the n2 subgroup and the n3 subgroup is defined to be $X_2 = 0.5 \times X_1$, and the margin interval for the n3 subgroup and the n4 subgroup is defined to be $X_3 = 0.5 \times X_2$, and so forth, but it is not limited thereby.

Figure 3C:
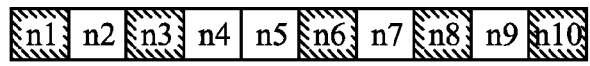
Figure 3D:

In addition to the aforesaid steps, the CAPTCHA image authentication method further comprises the steps of: randomly selecting P grades from the N grades so as to select the plural authentication objects from the subgroups relating to the selected P grades, whereas the value of P can be an integral value. As the shadowed area shown in the embodiment of FIG. 3C, there are five subgroups of different grades are selected randomly from the subgroups of 10 grades that are not located neighboring to one another, and after the five shadowed subgroups are selected, the plural authentication objects are selected only from the first objects in those selected five subgroups. Consequently, in combination with the concept of margin interval, operationally the CAPTCHA image authentication method will first define a margin interval to be used for defining a region evenly to the left and to the right from the border of any two neighboring subgroups of N grades, and accordingly remove each and every objects, referring as second objects, in those related neighboring subgroups that are located within their corresponding margin intervals; and then randomly select P grades from the N grades so as to select the plural authentication objects from the subgroups relating to the selected P grades after having their corresponding second objects removed. Similarly, the value of P can also be an integral value. As shown in the embodiment of FIG. 3D, according to the defining of the margin interval, the first objects located within a region evenly to the left and to the right from the border of any two neighboring subgroups of 10 grades are referred as second object and thus being removed from their corresponding subgroups, that is performed similar to the embodiment of FIG. 3B and thus is not described further herein. Thereafter, after the second objects are removed from their corresponding subgroups of 10 grades, five subgroups of different grades that are not located neighboring to one another are selected randomly form the 10 subgroup for allowing the authentication objects to be selected only from the five selected subgroups without the second objects.

At step s205, a plurality of authentication objects is selected from the subgroups of N grades to be used in an authentication process. According to the foregoing embodiments, the authentication objects can be selected from the n1 subgroup, the n2 subgroup, the n3 subgroup, . . . , and the n10 subgroup; or only from the five subgroups of different grades that are selected randomly from the subgroups of 10 grades.

Figure 4A:
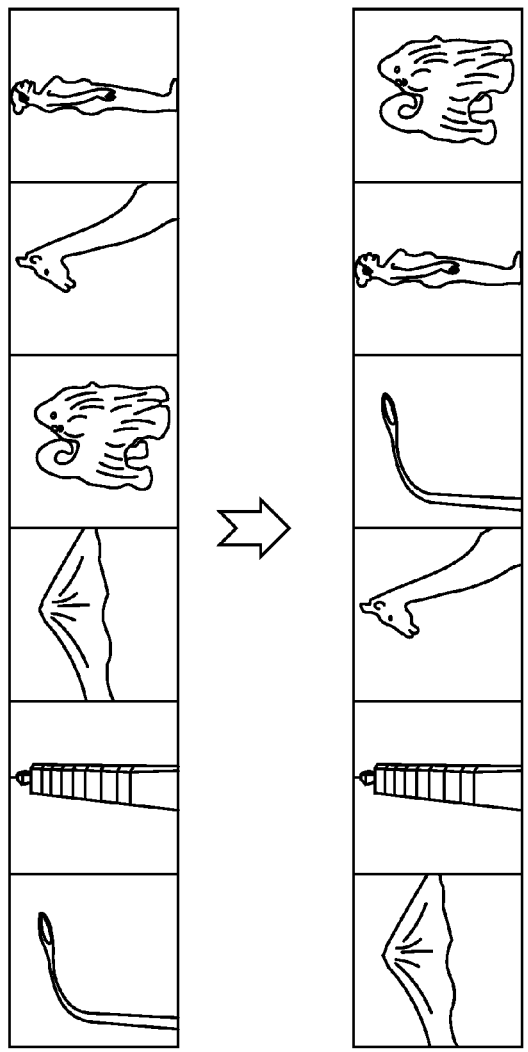
FIG. 4A and FIG. 4B are schematic diagrams showing respectively two examples utilizing the CAPTCHA image authentication method of the present disclosure.
Figure 4B:
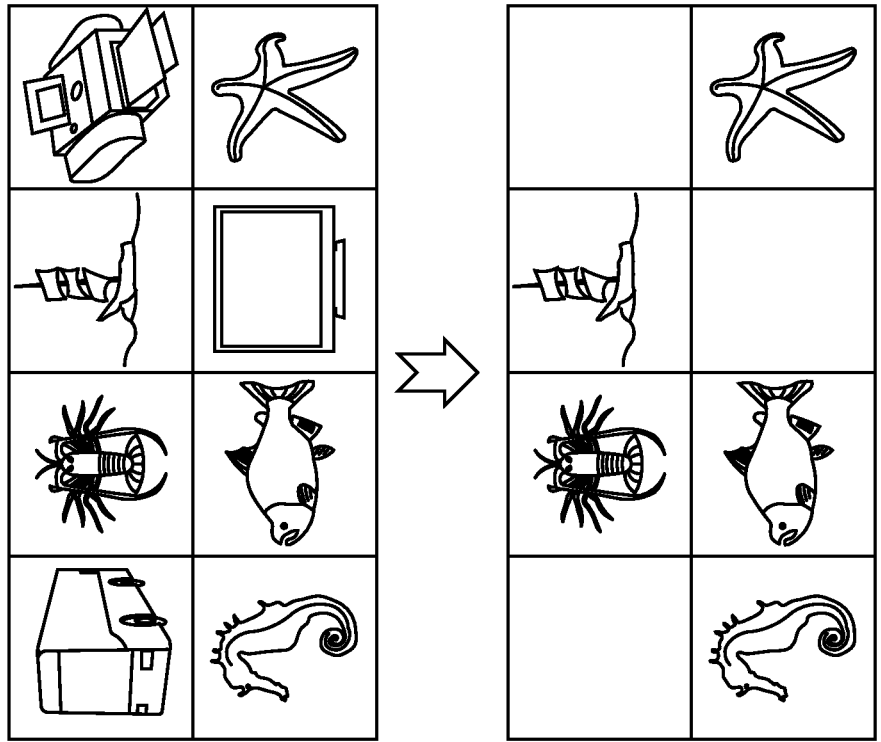
Figure 4B:
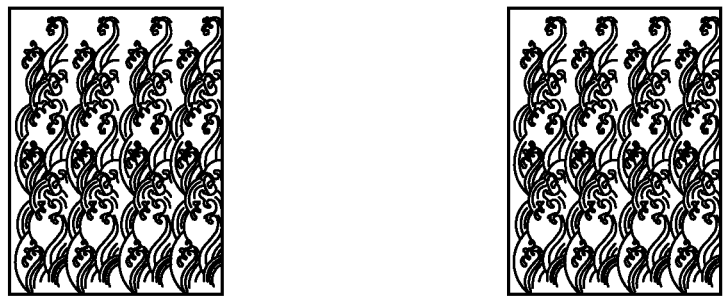

In addition, in an embodiment of the present disclosure, the CAPTCHA image authentication method further comprises the steps of: defining a selection criteria before or after completion of the selection of the plural authentication objects; displaying the selection criteria and the plural authentication objects on a display unit 14 for allowing a user to acquire and sort the plural authentication according to the selection criteria; and making an evaluation to determine whether the plural authentication objects are successfully acquired and are sorted corrected; and if so, the authentication process is determined to be passed; otherwise, the authentication process is failed while enabling a new set of authentication objects to be selected. It is noted that the selection criteria can be configured with texts, pictures and images. As shown in FIG. 4A, in response to the selection criteria that is defined as: sorting the authentication objects according to height, the six authentication objects that are selected from the subgroups of 10 grades, or from five subgroups of different grades that are selected randomly from the subgroups of 10 grades are being displayed on the display unit 14 for enabling a user to sort the plural authentication according to the selection criteria, i.e. to aligned the six authentication objects of a street lamp, a skyscraper, a mountain, a puppy, a giraffe and a adult human from left to right in an order of from low to high, and when the six authentication objects are sorted and aligned correctly, as shown in FIG. 4B, the authentication process is determined to be passed; otherwise, the authentication process is failed while enabling a new set of authentication objects to be selected. In another embodiment shown in FIG. 4B, in response to a selection criteria that is defined as: selecting the authentication objects shown on the right image that are related to the image shown on the left. That is, in this embodiment, the authentication object whichever is related to ocean should be selected. Thus, form the eight first objects, i.e. a bus, a lobster, a ship, a printer, a sea horse, a fish, a monitor and a sea star, the five objects that are related to ocean should be selected so as to pass the authentication process. Consequently, if all the five ocean-related objects are selected correctly, the six authentication objects are sorted and aligned correctly, as shown in FIG. 4B, the authentication process is determined to be passed; otherwise, the authentication. It is noted that the selection criteria can be defined and displayed before or after the plural authentication objects are selected and available, or at the same time when the plural authentication objects are selected and available.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A Completely Automated Public Turing Test to tell Computers and Humans Apart (CAPTCHA) image authentication method, comprising the steps of:
    collecting a plurality of first objects;
    defining a plurality of variables so as to be used as basis for classifying and dividing the plurality of first objects into M groups accordingly while allowing each group in the M groups to correspond to at least one variable selected from the plurality of variables;
    selecting one or more groups from the M groups while further grading and dividing the first objects in the selected one or more groups into subgroups of N grades based upon a standard unit of the variable corresponding to the selected one or more groups;
    sorting and storing the subgroups of N grades for each of the one of more groups;
    selecting a plurality of authentication objects from the subgroups of N grades for each of the one of more groups to be used in an authentication process;
    defining a selection criteria for each of the one of more groups based on the plurality of variables corresponding to each group;
    displaying the selection criteria and the plurality of authentication objects for each of the one of more groups on a display unit;
    requesting a user to sort the plurality of authentication objects for each of the one of more groups according to the selection criteria; and
    determining whether the plurality of authentication objects are sorted correctly for each of the one of more groups, and if so, the authentication process is determined to have passed, else selecting a new set of authentication objects for a future authentication process and the authentication process is determined to have failed.

2. The CAPTCHA image authentication method of claim 1, wherein each of the first objects is an object selected from the group consisting of: a static picture, a dynamic image, or the combination of the two.

3. The CAPTCHA image authentication method of claim 1, wherein each of the plural variables is a measureable variable, and the plural variables may include size, speed, weight, height, volume, age, length, or area.

4. The CAPTCHA image authentication method of claim 1, further comprising the steps of:
    defining a margin interval for each group to be used for defining a region evenly to the left and to the right from the border of any two neighboring subgroups of corresponding N grades for each of the one or more groups after being sorted, and accordingly removing a set of second objects, in those related neighboring subgroups that are located within corresponding margin intervals; and
    selecting the plural authentication objects for each of the one of more groups from the subgroups of N grades for each of the one or more groups after having their corresponding second objects removed.

5. The CAPTCHA image authentication method of claim 1, further comprising the steps of:
    randomly selecting P grades from the N grades of each of the one or more groups so as to select the plural authentication objects for each of the one or more groups from the subgroups relating to the selected P grades.

6. The CAPTCHA image authentication method of claim 1, further comprising the steps of:
    after sorting the selected one or more groups into subgroups of N grades for each of the one or more groups, defining a margin interval to be used for defining a region evenly to the left and to the right from the border of any two neighboring subgroups of N grades for each of the one or more groups, and accordingly removing a set of second objects, in those related neighboring subgroups that are located within their corresponding margin intervals; and
    randomly selecting P grades for each of the one or more groups from the N grades of each of the one or more groups so as to select the plural authentication objects for each of the one of more groups from the subgroups relating to the selected P grades for each of the one or more groups after having their corresponding second objects removed.

7. The CAPTCHA image authentication method of claim 4, wherein the margin interval is defined based upon a mathematics equation.

8. The CAPTCHA image authentication method of claim 7, wherein the margin interval is defined to be a present difference or a preset multiple between any two neighboring subgroups of N grades for each of the one of more groups.

9. The CAPTCHA image authentication method of claim 8, wherein the preset multiple is increasing or decreasing from a predesignated starting set for each of the one of more groups including two neighboring subgroups to the left or to the right to those other sets of two neighboring subgroups of each of the one of more groups.

10. The CAPTCHA image authentication method of claim 1, wherein the values of M and N are integral values.

11. The CAPTCHA image authentication method of claim 5, wherein the value of P is an integral value.

12. The CAPTCHA image authentication method of claim 1, wherein the selection criteria is any combination of texts, pictures and images.

13. A Completely Automated Public Turing Test to tell Computers and Humans Apart CAPTCHA image authentication system, comprising:

an acquisition unit, for collecting a plurality of first objects;

a processing unit, coupling to the acquisition unit to be used for defining a plurality of variables while allowing the plural variables to be used as basis for performing the following procedures:

classifying and dividing the plurality of first objects into M groups accordingly while allowing each group in the M groups to correspond to at least one variable selected from the plurality of variables;

selecting one or more groups from the M groups while further grading dividing the first objects in the selected one or more groups into subgroups of N grades based upon a standard unit of the variable corresponding to the selected one or more groups;

sorting and storing the subgroups of N grades for each of the one or more groups;

selecting a plurality of authentication objects from the subgroups of N grades for each of the one or more groups to be used in an authentication process;

defining a selection criteria for each of the one or more groups based on the plurality of variables corresponding to each group;

displaying the selection criteria and the plurality of authentication objects for each of the one or more groups on a display unit;

requesting a user to sort the plurality of authentication objects for each of the one or more groups according to the selection criteria; and determining whether the plurality of authentication objects are sorted correctly for each of the one or more groups, and if so, the authentication process is determined to have passed, else selecting a new set of authentication objects for a future authentication process and the authentication process is determined to have failed; and a storage unit, coupling to the processing unit to be used for storing the sorted subgroups of N grades for each of the one or more groups.

14. The CAPTCHA image authentication system of claim 13, wherein each of the first objects is an object selected from the group consisting of: a static picture, a dynamic image, or the combination of the two.

15. The CAPTCHA image authentication system of claim 13, wherein each of the plural variables is a measureable variable, and the plural variables may include size, speed, weight, height, volume, age, length, or area.

16. The CAPTCHA image authentication system of claim 13, wherein after sorting the selected group into subgroups of N grades for each of the one or more groups, the processing unit is configured to perform the following procedure:

after sorting the selected one or more groups into subgroups of N grades for each of the one or more groups, defining a margin interval to be used for defining a region evenly to the left and to the right from the border of any two neighboring subgroups of N grades for each of the one or more groups, and accordingly removing a set of second objects, in those related neighboring subgroups that are located within their corresponding margin intervals; and selecting the plural authentication objects for each of the one of more groups from the subgroups of N grades of each of the one or more groups after having their corresponding second objects removed.

17. The CAPTCHA image authentication system of claim 13, wherein after sorting the selected group into subgroups of N grades for each of the one or more groups, the processing unit is configured to perform the following procedure:

randomly selecting P grades from the N grades of each of the one or more groups so as to select the plural authentication objects for each of the one or more groups from the subgroups relating to the selected P grades.

18. The CAPTCHA image authentication system of claim 13, wherein after sorting the selected one or more groups into subgroups of N grades for each of the one or more groups, the processing unit is configured to perform the following procedure:

defining a margin interval to be used for defining a region evenly to the left and to the right from the border of any two neighboring subgroups of N grades for each of the one or more groups after being sorted, and accordingly removing each and every objects, referring as second objects, in those related neighboring subgroups that are located within their corresponding margin intervals; and randomly selecting P grades from the N grades of each of the one or more groups so as to select the plural authentication objects from the subgroups relating to the selected P grades after having their corresponding second objects removed.

19. The CAPTCHA image authentication system of claim 16, wherein the margin interval is defined based upon a mathematics equation.

20. The CAPTCHA image authentication system of claim 19, wherein the margin interval is defined to be a present difference or a preset multiple between any two neighboring subgroups of N grades for each of the one or more groups.

21. The CAPTCHA image authentication system of claim 20, wherein the preset multiple is increasing or decreasing from a predesignated starting set of each of the one of more groups two neighboring subgroups to the left or to the right to those other sets of two neighboring subgroups for each of the one of more groups.

22. The CAPTCHA image authentication system of claim 13, wherein the values of M and N are integral values.

23. The CAPTCHA image authentication system of claim 17, wherein the value of P is an integral value.

* * * * *